United States Patent
Nguyen et al.

(10) Patent No.: US 9,413,616 B2
(45) Date of Patent: Aug. 9, 2016

(54) DETECTION OF NETWORK ADDRESS SPOOFING AND FALSE POSITIVE AVOIDANCE

(75) Inventors: Ted T Nguyen, Antelope, CA (US); Lynette Nguyen, Folsom, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 1847 days.

(21) Appl. No.: 12/579,270

(22) Filed: Oct. 14, 2009

(65) Prior Publication Data

US 2011/0088092 A1   Apr. 14, 2011

(51) Int. Cl.
| | |
|---|---|
| G06F 11/00 | (2006.01) |
| G06F 12/14 | (2006.01) |
| G06F 12/16 | (2006.01) |
| G08B 23/00 | (2006.01) |
| H04L 12/24 | (2006.01) |
| H04L 29/06 | (2006.01) |

(52) U.S. Cl.
CPC ............ *H04L 41/28* (2013.01); *H04L 63/1416* (2013.01); *H04L 63/1466* (2013.01); *H04L 63/1483* (2013.01)

(58) Field of Classification Search
CPC ............ H04L 63/14–63/1425; H04L 63/1483
USPC ................ 726/22, 23; 713/151; 709/223–226
See application file for complete search history.

(56) References Cited

U.S. PATENT DOCUMENTS

| | | | |
|---|---|---|---|
| 7,171,683 B2 * | 1/2007 | Pazi et al. ........................ | 726/13 |
| 8,074,279 B1 * | 12/2011 | Lin ........................ | H04W 12/08 |
| | | | 709/243 |
| 2004/0213172 A1 | 10/2004 | Myers et al. | |
| 2005/0021740 A1 * | 1/2005 | Bar et al. ........................ | 709/224 |
| 2005/0180421 A1 * | 8/2005 | Shimada et al. .............. | 370/389 |
| 2005/0286423 A1 * | 12/2005 | Poletto et al. ................. | 370/235 |

OTHER PUBLICATIONS

Cardenas, E., "MAC Spoofing—An Introduction", Aug. 23, 2003, Sans Institute, Global Information Assurance Certification Paper, pp. 1-15.*

* cited by examiner

*Primary Examiner* — Daniel Potratz
(74) *Attorney, Agent, or Firm* — Hewlett Packard Enterprise Patent Department

(57) ABSTRACT

A method for detection of network address spoofing and false positive avoidance in a network is described herein. The network may include one or more hosts and a network management system. The network management system may identify a suspicious host in the network. A condition indicative of network address spoofing by the suspicious host may be detected. It may be determined whether the spoofing condition is expected in normal traffic of the network. In response to a determination that the spoofing condition is expected, it is determined that the suspicious host generated normal traffic.

9 Claims, 4 Drawing Sheets ent, a host device is identified as a suspicious host. Analysis is performed to differentiate between normal traffic and real intrusions. The analysis considers various false positive avoidance schemes in making the distinction.

DETECTION OF NETWORK ADDRESS SPOOFING AND FALSE POSITIVE AVOIDANCE

I. BACKGROUND

With the rapid growth of computer network technology in general, network security has become a major concern. The fact that the tools and information needed to penetrate the security of computer networks are widely available has increased that concern. A malicious host wishing to attack the network has a wide arsenal available to them. Many of the tools for attack rely on "spoofing" or otherwise using a faked network address to masquerade as an authorized host. Using this technique, the malicious host can launch denial of service attacks, bypass access control mechanisms, or otherwise disrupt the network.

To protect against such attack, it is desirable to identify and locate the malicious host. However, an attacker can present itself as an authorized host by using a forged source address. In some situations, the source MAC address and/or the source IP address of the malicious host is forged or spoofed. Additionally, all other standard identification information in the packet that points to the source host can be spoofed. This makes it difficult to identify the source malicious host.

Even where spoofed packets are detected, the results of such detection may be prone to a high incidence of false positives. It may be the responsibility of the network administrator to investigate false positive alerts. Where false positives are numerous, it becomes quite cumbersome to track down the false positives, rule out maliciousness, and take subsequent action where relevant.

II. BRIEF DESCRIPTION OF THE DRAWINGS

The present disclosure may be better understood and its numerous features and advantages made apparent to those skilled in the art by referencing the accompanying drawings.

III. DETAILED DESCRIPTION OF THE INVENTION

Figure 1:
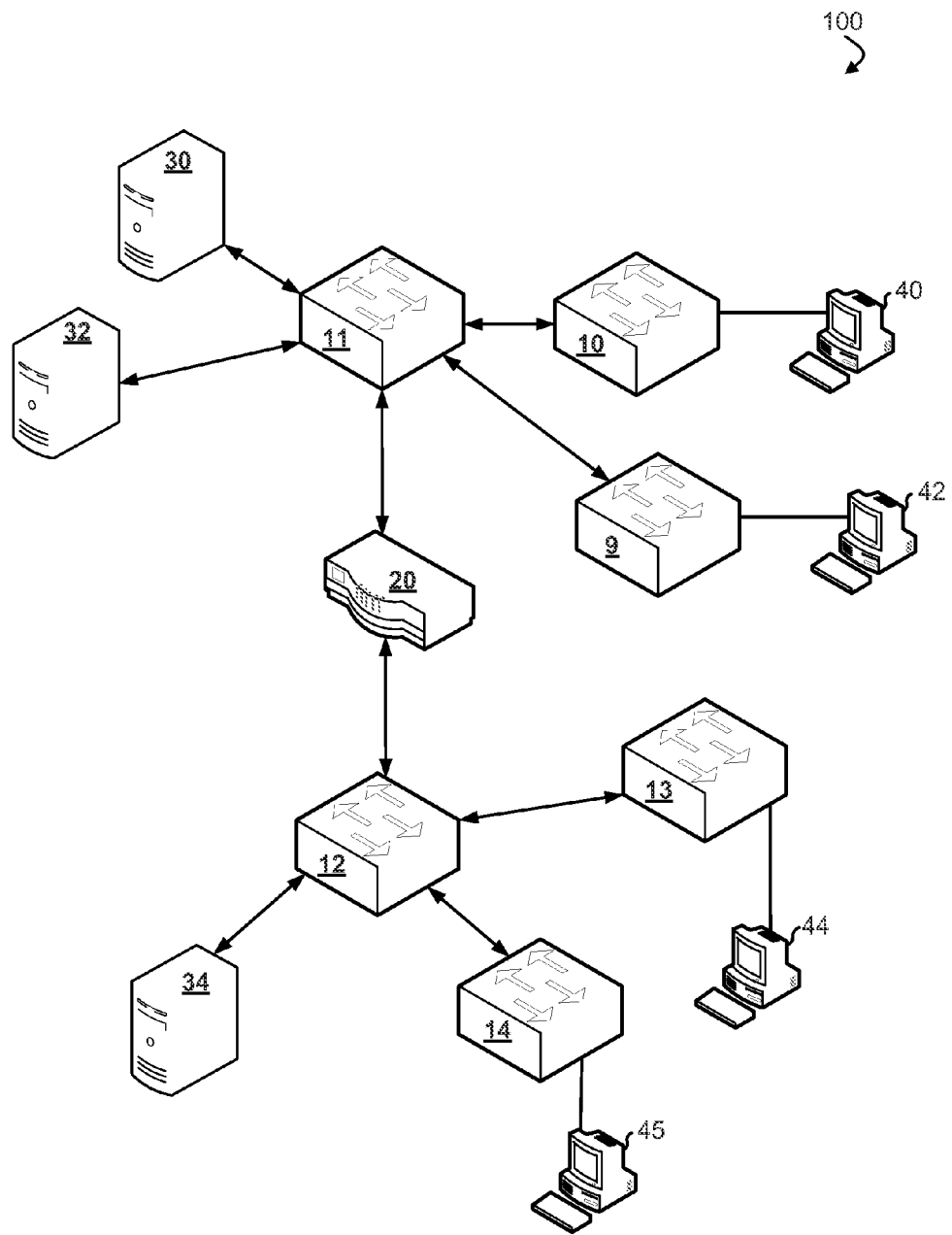
FIG. 1 is topological block diagram of a network system in accordance with an embodiment of the invention.

Network security systems may be used today to monitor the health of a managed network, which may include monitoring for network address spoofing. Often times, these network security systems are plagued by false positive events. A false positive occurs when a vulnerability is detected based on an analysis of data, when the vulnerability does not actually exist. In the context of network address spoofing, a false positive is the detection of network address spoofing, when network packets have not been actually spoofed.

A flood of false positive events can severely hamper the credibility of the monitoring system and can impart undue burden on the network administrator to resolve each false positive event. A detection and analysis methodology for network address spoofing is described herein which minimizes the occurrence of false positive events. In one embodiment, a host device is identified as a suspicious host. Analysis is performed to differentiate between normal traffic and real intrusions. The analysis considers various false positive avoidance schemes in making the distinction.

A network may include one or more hosts and a network management system. The network management system may identify a suspicious host in the network. A condition indicative of network address spoofing by the suspicious host may be detected. It may be determined whether the spoofing condition is expected in normal traffic of the network. In response to a determination that the spoofing condition is expected, it is determined that the suspicious host generated normal traffic.

In one embodiment, the spoof condition may be detected by determining that the suspicious host is associated with a plurality of varying time to live (TTL) values, and determining whether the condition is expected comprises determining whether the suspicious host is a router. Multiple methodologies may be used to determine whether the suspicious host is a router. For example, a plurality of TTL values associated with the suspicious host may be compared to a list of TTL values correlated with computer operating systems. The spoof condition is not expected where a TTL value of the plurality of TTL values associated with the suspicious host appears on the list of TTL values correlated with computer operating systems. In another example, the source MAC address of the suspicious host is compared to a list of MAC addresses of known routers in the network. The spoof condition is expected where the source MAC address of the suspicious host appears on the list.

In another embodiment, the spoof condition may be detected by detecting an out-of-sequence reset flag in a traffic summary of a plurality of traffic summaries, where each traffic summary is associated with one or more data packets traversing the network. It may be determined whether the condition is expected by determining a number of out-of-sequence reset flags detected during a time interval and comparing the number of out-of-sequence reset flags with a threshold. The condition is determined to be not expected in normal traffic of the network where the number of out-of-sequence reset flags exceeds the threshold.

FIG. 1 is topological block diagram of a network system 100 in accordance with an embodiment of the invention. Network system 100 includes a network management server 30, a traffic data collection server 32, a traffic data collection server 34, a router 20, a network switch 9, a network switch 10, a network switch 11, a network switch 12, a network switch 13, a network switch 14, a host 40, a host 42, a host 44, and a host 45.

Network management server 30 is operatively coupled to network switch 11. The connection between network management server 30 and network switch 11 may include multiple network segments, transmission technologies and components. Network management server 30 is configured to manage, monitor, and/or deploy a network. Network management server 30 may be further configured to inspect and analyze traffic summary information collected by one or more traffic data collectors and to detect network address spoofing activities in network system 100 based on the analysis of the traffic summary information. Further analysis is performed considering false positive conditions.

Traffic data collection server 32 is operatively coupled to switch 11. The connection between traffic collection server 32 and network switch 11 may include multiple network segments, transmission technologies and components. Traffic data collection server 32 is configured to collect statistical sampling data of network traffic, for example from one or more network devices that are managed by network management server 30. As discussed herein, traffic data collection server 32 may implement a network management protocol that enables traffic summary information (e.g., source address, destination address, timestamp, raw packet header information, or other statistical sampling data of network traffic) to be gathered. Examples of the network management protocol may include, but are not limited to, sFlow, NetFlow, remote monitoring (RMON), simple network management protocol (SNMP), and Extended RMON.

Network system 100 may include one or more traffic data collectors. As shown, traffic data collection server 34 may be included in network system 100. Traffic data collection server 34 is also configured to collect statistical sampling data of network traffic, for example from one or more network devices that are managed by network management server 30. Traffic data collection server 34 is operatively coupled to switch 12. The connection between traffic collection server 34 and network switch 12 may include multiple network segments, transmission technologies and components.

Network switch 11 is operatively coupled to network management server 30 and traffic data collection server 32. Additionally, network switch 11 includes multiple ports, which connect to network switch 9, network switch 10, and router 20.

Network switch 10 is operatively coupled to network switch 11. Network switch 10 includes multiple ports, one of which connects to host 40. Network switch 10 may be an edge device. As used herein, an edge device is a network switch, router, or other network device on the edge of a network. Host devices connect directly to the edge device via an edge port. As used herein, an edge port is a port of an edge device.

Network switch 9 is operatively coupled to network switch 11. Network switch 9 includes multiple ports, one of which connects to host 42. Network switch 9 may be an edge device.

Network switch 12 is operatively coupled to traffic data collection server 34. Network switch 12 includes multiple ports, which connect to network switch 13 and router 20. Network switch 13 is operatively coupled to network switch 12. Network switch 14 is operatively coupled to network switch 12.

In one embodiment, network switches 9-14 are configured to process and transfer data in a network. Additionally, network switches 9-14 may be under the purview and control of network management server 30. Network switches 9-14 are further configured to collect and report network traffic data or other network summary information to a traffic data collector, such as traffic data collection server 32 and/or traffic data collection server 34. As used herein, network summary information may be a statistical sampling data of network traffic on the respective network device, raw packet header information, or a subset thereof.

Each of network switches 9-14 may include an agent which is configured to collect network traffic data of each packet that enters or exits through the switch. Due to the massive amounts of data passing through the network, the agent may collect and report a sampling of the network traffic header information such as IP time to live (TTL), IP protocol, TCP flags, source IP, source MAC, destination IP, destination MAC, and the like. For example, a data packet may traverse a network switch, such as one of network switches 9-14. Upon handling the data packet, the network switch may collect and store a sampling of the header of the packet. In another embodiment, a subset of the packet's header is collected and stored. The reported network summary information may be used by network management server 30 for security monitoring and other purposes.

Router 20 is operatively coupled to network switch 11 and network switch 12. Router 20 is configured to process and transfer data in a network. Additionally, router 20 may be under the purview and control of network management server 30 and may be configured to collect and report network traffic data or other network summary information to a traffic data collector, such as traffic data collection server 32 and/or traffic data collection server 34.

Each data packet sent from a host, such as hosts 40-45, contains a source IP address, a source MAC address, and an IP default initial time to live (TTL) value. The default initial TTL value is correlated with the computer operating system running on the host from which the data packet originated. The following table illustrates an exemplary correlation between the default initial TTL values and computer operating systems:

TABLE 1

| Operating System | Default Initial TTL Value |
|---|---|
| Windows Vista ®, Windows ® XP, Windows ® 2000, Windows NT ®, Windows ® 4.0 | 128 |
| Linux ® | 64 |
| Mac OS ® 10 | 64 |

In operation, upon handling the data packets and other network traffic, traffic summary information may be collected by and stored on the controlled network devices, such as network switches 9-14 and router 20. The traffic summary information may be then collected by traffic data collection server 32 and subsequently retrieved by or pushed to the network management server 30.

In one embodiment, the traffic summary information includes the source MAC address, the source IP address, and the default initial TTL. The traffic summary information may be inspected and each source MAC address, source IP, and the associated default initial TTL value from the traffic summary information may be tracked, for example using a hash map. The tracking function may be performed by a spoofing detection engine, which may be implemented on the network management server 30. The spoofing detection engine may identify a suspicious host, for example, using the hash map. An exemplary hash map is provided below:

TABLE 2

| Host | Source MAC Address | Source IP Address | Default Initial TTL |
|---|---|---|---|
| Host 40 | 00:00:00:00:00:0A | 10.10.10.1 | 128 |
| Host 42 | 00:00:00:00:00:0B | 10.10.10.2 | 64 |
| Host 44 | 00:00:00:00:00:0C | 10.10.10.1 | 64 |
|  | 00:00:00:00:00:0C | 10.10.10.3 | 67 |
|  | 00:00:00:00:00:0C | 10.10.10.1 | 100 |
|  | 00:00:00:00:00:0C | 10.10.10.2 | 91 |
| Host 45 | 00:00:00:00:00:0D | 10.10.20.1 | 128 |
| Router 20 | 00:00:00:00:00:01 | 10.10.10.100 |  |
|  | 00:00:00:00:00:01 | 10.10.20.1 | 127 |

The suspicious host may be identified. In one embodiment, a source MAC address that is associated with multiple varying source IP addresses are identified as suspicious hosts. Using the exemplary hash map, the source MAC address of Host 44 (i.e., 00:00:00:00:00:0C) is associated with three different source IP addresses. As such, the source MAC address 00:00:00:00:00:0C is identified as a suspicious host. The spoofing detection engine may determine whether the suspicious host generated spoofed traffic while considering one or more false positive conditions.

Additionally, the source MAC address of router 20 (i.e., 00:00:00:00:00:01) is shown as being associated with two different source IP addresses. Routers, such as router 20, may replace incoming source MAC addresses with its own MAC address. For example, host 45 may communicate a data packet to host 40. Switch 12 may detect and/or report the following or a subset thereof:

IP TTL=128, src MAC=00:00:00:00:00:0D, src IP=10:10:20.1, dest MAC 00:00:00:00:00:0A, dest IP=10.10.10.1

After traversing router 20, switch 11 may detect and/or report the following or a subset thereof:

IP TTL=127, src MAC=00:00:00:00:00:01, src IP=10:10:20.1, dest MAC 00:00:00:00:00:0A, dest IP=10.10.10.1

In the exemplary embodiment, the source MAC address of router 20 (i.e., 00:00:00:00:00:01) is associated with the source IP address 10.10.10.100 and the source IP address 10.10.20.1 of host 45. Even though router 20 may behave like a suspicious host, it is not. Regardless, router 20 may be identified as such based on typical spoofing detection methodologies. In one embodiment of the present invention, the spoofing detection engine may recognize this potential false positive condition and may filter out routers as potential malicious hosts.

The present invention can also be applied in other network topologies and environments. Network 100 may be any type of network familiar to those skilled in the art that can support data communications using any of a variety of commercially-available protocols, including without limitation TCP/IP, SNA, IPX, AppleTalk, and the like. Merely by way of example, network 100 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

Figure 2:
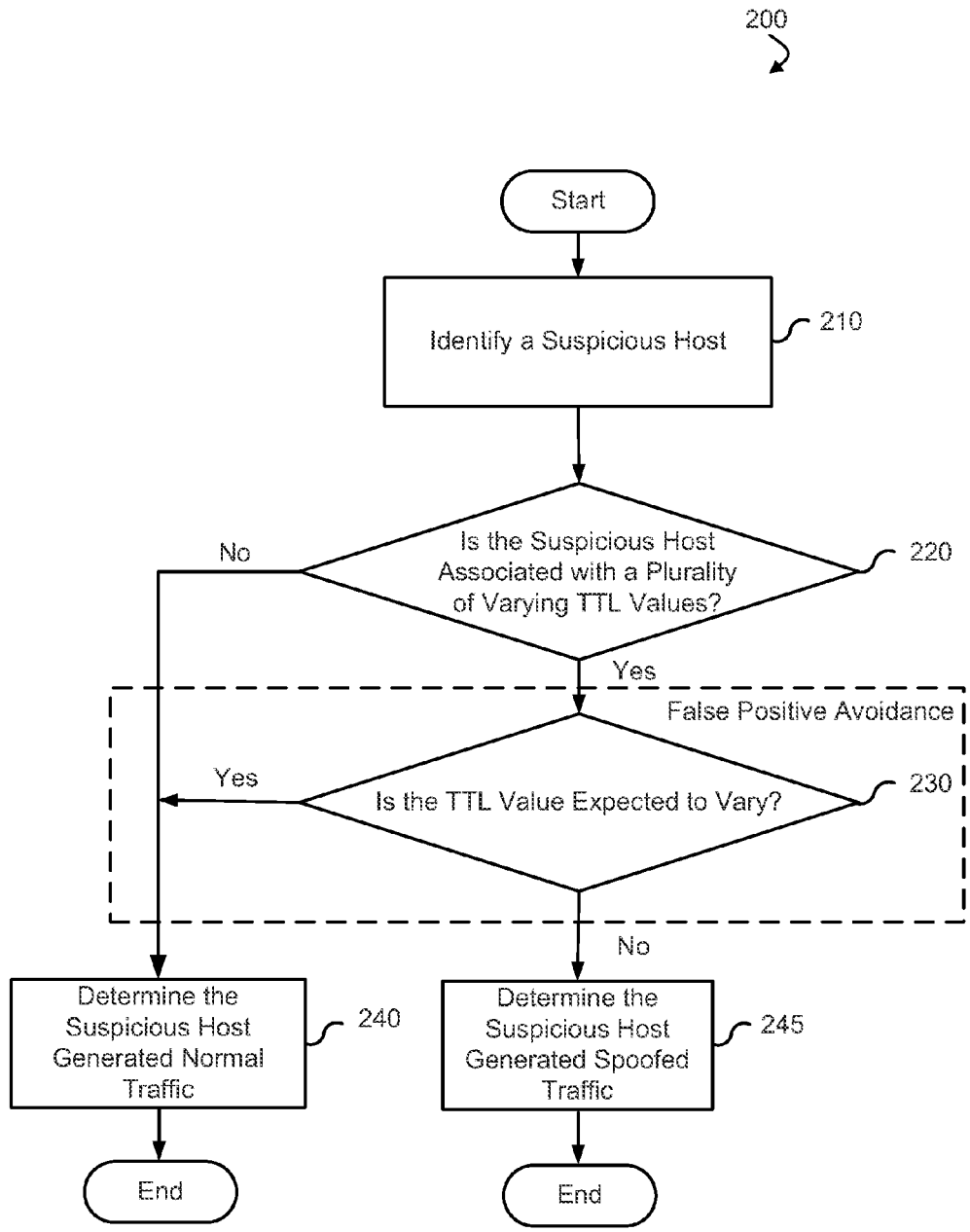
FIG. 2 is a process flow diagram for false positive avoidance in accordance with an embodiment of the invention.

FIG. 2 is a process flow diagram for false positive avoidance in accordance with an embodiment of the invention. The depicted process flow 200 is carried out by execution of one or more sequences of executable instructions. In another embodiment, the process flow 200 is carried out by execution of components of a network device, an arrangement of hardware logic, e.g., an Application-Specific Integrated Circuit (ASIC), etc.

In a network having one or more network devices under common management and control, the network device may provide traffic summary information, for example, to a traffic data collection server. A network management server may analyze the traffic summary information to detect network address spoofing activities in the network based on the analysis of the traffic summary information. Further analysis is performed considering false positive conditions.

As previously described, the traffic summary information includes the source MAC address, the source IP address, and the default initial TTL. A tracking of each source MAC address, source IP address, and the associated IP TTL value may be maintained, for example, in a hash map.

At step 210, a suspicious host is identified. In one embodiment, using the hash map, a MAC address that is associated with multiple varying source IP addresses is identified as a suspicious host.

At step 220, it is determined whether the suspicious host is associated with a plurality of varying TTL values. Variance in the TTL values associated with a source MAC address may be indicative of spoofing in the network. For example, it is recognized that unauthorized hosts may modify the TTL value when sending an IP spoofed packet. Moreover, network scanning tools such as Network Mapper (Nmap) use random TTL values when scanning the network for vulnerabilities using a spoofing option. In one embodiment, the hash map is used to determine if there are multiple varying TTL values associated with the MAC address identified as the suspicious host.

Where the suspicious host is not associated with a plurality of varying TTL values, processing continues to step 240 and it is determined that the suspicious host generated normal traffic. Where a plurality of TTL values are detected, false positive avoidance may be performed and processing continues to step 230.

False Positive Avoidance

There are certain spoof conditions (i.e., conditions which are generally indicative of an occurrence of spoofing) which may trigger false positive events, i.e., the detection of network spoofing when no network packets have been actually spoofed. For example, a spoof condition can trigger a false positive event when the condition is actually expected to occur during the normal course of traffic flow. Accordingly, in order to minimize the occurrence of false positive events, it is determined whether the spoof condition is actually expected to occur during the course of normal traffic.

One such spoof condition which may trigger a false positive event is a variance of the default initial TTL value(s), and this condition can be expected where the traffic traverses a router. At step 230, it is determined whether the default initial TTL value(s) associated with the source MAC address identified as the suspicious host is expected to vary. Specifically, the default initial TTL values are expected to vary where the traffic traverses a router.

An understanding of the behavior of a router can be leveraged to determine whether the traffic of the suspicious host traversed a router. In one embodiment, when traffic is forwarded by a router, the router may decrement the TTL value by one. For example, a host may send a packet with a default initial TTL value of 128. As indicated in Table 1, the default initial TTL value of 128 correlates with a Windows Vista operating system. Thereafter, the packet is traversed through a router which then decrements the TTL value to 127. In another example, a packet may traverse multiple routers, each of which decrements the default initial TTL value at each hop. As such, it is expected that the TTL values associated with the router may be different from a TTL value that correlates with an operating system. The plurality of TTL values associated with the suspicious host, as found in the hash map, are compared to a list of TTL values correlated with computer operating systems. It is determined whether any of the TTL values associated with the MAC address identified as the suspicious host are different from the TTL values that correlate with an operating system. In other words, it is determined whether any of the default initial TTL values are different from the TTL values of Table 1, as described above.

Where the TTL values of the suspicious host are all the same as the default initial TTL values of known operating systems, it can be determined that the traffic did not pass through a router and the TTL value associated with the suspicious host is not expected to vary. On the other hand, where one or more of the TTL values of the suspicious host are different from the default initial TTL values of known operating systems, it can be determined that the traffic passed through the router and the TTL value associated with the suspicious host is indeed expected to vary. In one embodiment, the amount or nature of the difference between the TTL values of the suspicious host and the default initial TTL values of known operating systems may be examined.

In another embodiment, it can be determined that the traffic traversed a router by recognizing that many routers implement network address translation (NAT) by replacing the incoming source MAC address with its own source MAC address. As such, it may be determined that the traffic of the suspicious host traversed a router by comparing the source MAC address identified as the suspicious host with a list of MAC addresses of all known routers used in the network. The list of MAC addresses is maintained, for example, by a network administrator.

Where the source MAC address identified as the suspicious host appears on the list, it can be determined that the traffic passed through the router and the TTL values associated with the suspicious host are expected to vary. On the other hand, where the source MAC address identified as the suspicious host does not appear on the list, it can be determined that the traffic did not pass through the router and the TTL values associated with the suspicious host are not expected to vary.

Where the TTL value is expected to vary, processing continues to step 240 and it is determined that the suspicious host generated normal traffic. The consideration of the false positive condition (i.e., whether the TTL value was expected to vary) allowed traffic that would have otherwise been identified wrongfully as spoofed traffic is correctly identified as normal traffic.

Where the TTL value is not expected to vary, processing continues to step 245 and it is determined that the suspicious host generated spoofed traffic. Once the spoofing event is detected, various actions may be taken automatically. For example, the switch port where the suspicious host was connected may be disabled, thereby locking out a hacker or other unauthorized user from the network.

Figure 3:
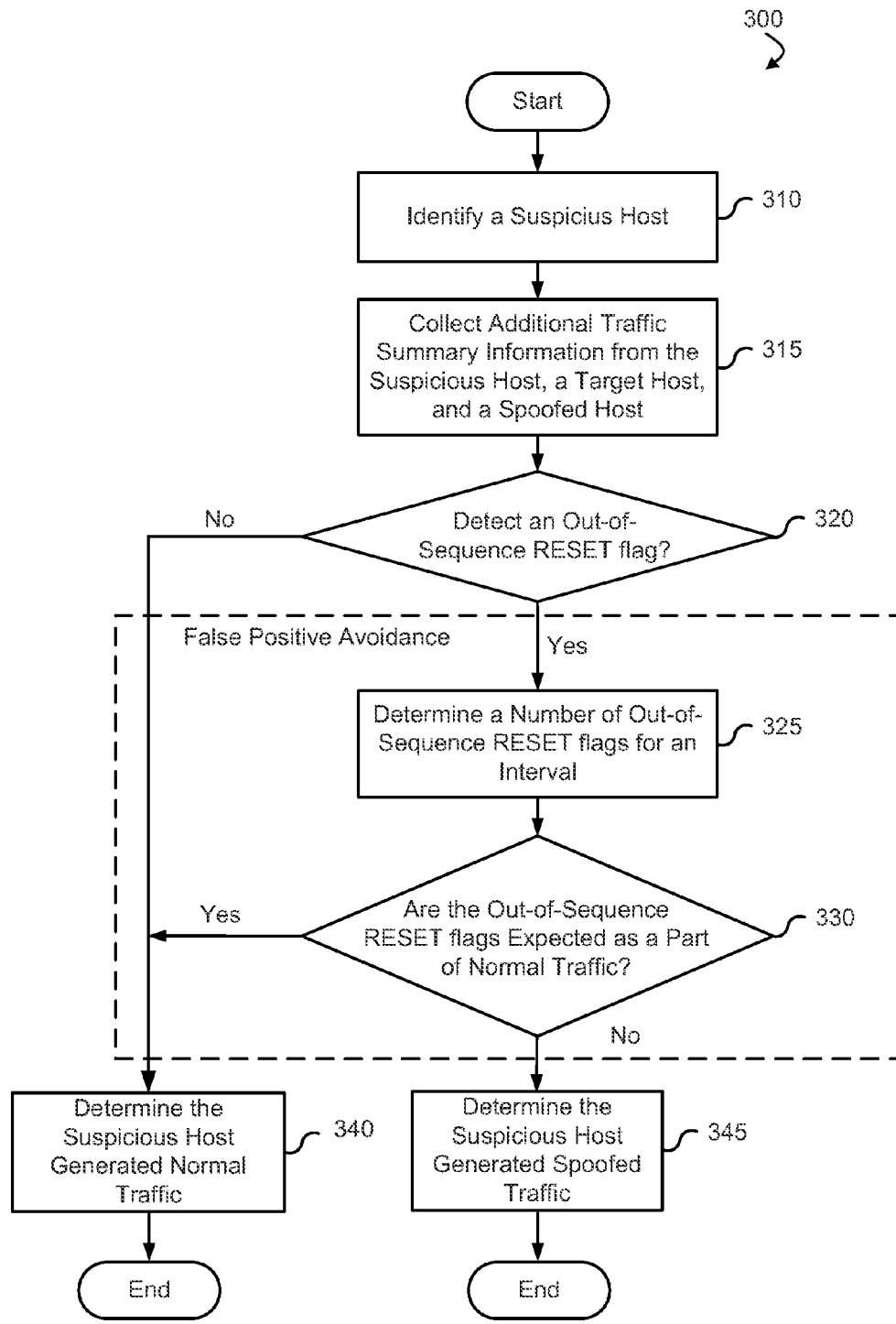
FIG. 3 is another process flow diagram for false positive avoidance in accordance with an embodiment of the invention.

FIG. 3 is another process flow diagram for false positive avoidance in accordance with an embodiment of the invention. The depicted process flow 300 is carried out by execution of one or more sequences of executable instructions. In another embodiment, the process flow 300 is carried out by execution of components of a network device, an arrangement of hardware logic, e.g., an Application-Specific Integrated Circuit (ASIC), etc.

In a network having one or more network devices under common management and control, the network device may provide traffic summary information, for example, to a traffic data collection server. A network management server may analyze the traffic summary information to detect network address spoofing activities in a network system based on the analysis of the traffic summary information. Further analysis is performed considering false positive conditions.

At step 310, a suspicious host is identified. In one embodiment, using the hash map as previously described, a MAC address that is associated with multiple varying source IP addresses is identified as a suspicious host.

At step 315, additional traffic summary information is collected from the suspicious host, target host, and spoofed host. In one example, the target host is the host identified as the destination of the data packet associated with the suspicious host. Since it is unknown which host is actually spoofed, it can be said that the spoofed host may be one of the multiple varying source IP addresses associated with the suspicious host. As such, additional traffic summary information may be collected from all of the source IP addresses associated with the suspicious host.

By collecting data in this targeted manner, the collection and monitoring of normal traffic from other hosts can be reduced or eliminated. The additional traffic summary information collected from the related hosts may be more detailed than the traffic summaries. For example, the additional traffic summaries may include TTL values, TCP RESET flags, source MAC address, source IP address, destination MAC address, destination IP address, etc. The additional traffic summaries may be collected for a configured period of time, such as a five minute interval.

Using the additional traffic summaries from the suspicious host, the target host, and the spoofed host, it is determined whether an out-of-sequence RESET flag is detected at step 320. An out-of-sequence RESET flag is a condition that may be indicative of spoofing in the network. As used herein, an out-of-sequence RESET flag is a reset flag that is returned to a host when it is not expected in a three-way TCP handshake connection exchange.

In a typical transmission control protocol (TCP) three-way handshake connection, a synchronization (SYN) message, a synchronization and acknowledgement (SYN+ACK) message, and an acknowledge (ACK) message are sent between a first host and a second host. It is recognized that a sending or receiving host that detects the handshake is out of synchronization will respond with a RESET flag to reset of the connection. In the case of IP spoofing, the spoofed host responds to the SYN+ACK message with a RESET flag since it did not initiate the connection.

In one embodiment, the additional traffic summary may be monitored and checked for out-of-sequence RESET flags at the configured time interval. Where an out-of-sequence RESET flag is not detected, processing continues to step 340, and it is determined that the suspicious host generated normal traffic. Where an out-of-sequence RESET flag is detected, false positive avoidance may be performed and processing continues to step 325.

False Positive Avoidance

As previously described, there are, certain spoof conditions which may trigger false positive events. For example, a spoof condition can trigger a false positive event when the condition is actually expected to occur during the normal course of traffic flow. Accordingly, in order to minimize the occurrence of false positive events, it is determined whether the spoof condition is actually expected to occur during the course of normal traffic.

One such spoof condition which may trigger a false positive event is the detection of out-of-sequence RESET flags), and this condition can be expected to occur occasionally during the normal flow of traffic. It is recognized that RESET flags may occur for many reasons, even during normal non-spoofed communications, but where the number of RESET flags exceeds a configurable threshold, spoofing activities may be underway in the network.

At step 325, a number of out-of-sequence RESET flags detected during a time interval is determined. Packets are analyzed and the number of packets having a set RESET flag are determined. The additional traffic summary information may be referenced to make this determination.

At step 330, it is determined whether the out-of-sequence RESET flags are expected as a part of normal traffic. As described herein, a number of out-of-sequence RESET flags detected during a time interval is compared to a configurable threshold and is. The out-of-sequence RESET flags may be expected to be a part of normal traffic where the number is less than or equal to the configurable threshold. The threshold may indicate the number of RESET flags that can be tolerated during the course of an attempt to make a connection.

Where the number of out-of-sequence RESET flags is less than the configured threshold, the out-of-sequence RESET flags are determined to be expected as a part of normal traffic. Processing continues to step 340, and it is determined that the suspicious host generated normal traffic.

On the other hand, where the number of out-of-sequence RESET flags meets or exceeds the configured threshold, the out-of-sequence RESET flags are determined to be unexpected. Processing continues to step 345, and it is determined that the suspicious host generated spoofed traffic.

All of the features disclosed in this specification (including any accompanying claims, abstract and drawings), and/or all of the steps of any method or process so disclosed, may be combined in any combination, except combinations where at least some of such features and/or steps are mutually exclusive. For example, false positive avoidance for excluding traffic that is generated from a router may be used in combination with false positive avoidance using out-of-sequence flags. In one embodiment, if traffic does not originate from a router, false positive avoidance as described in the process flow 300 may be performed. Other combinations may also be implemented.

Figure 4:
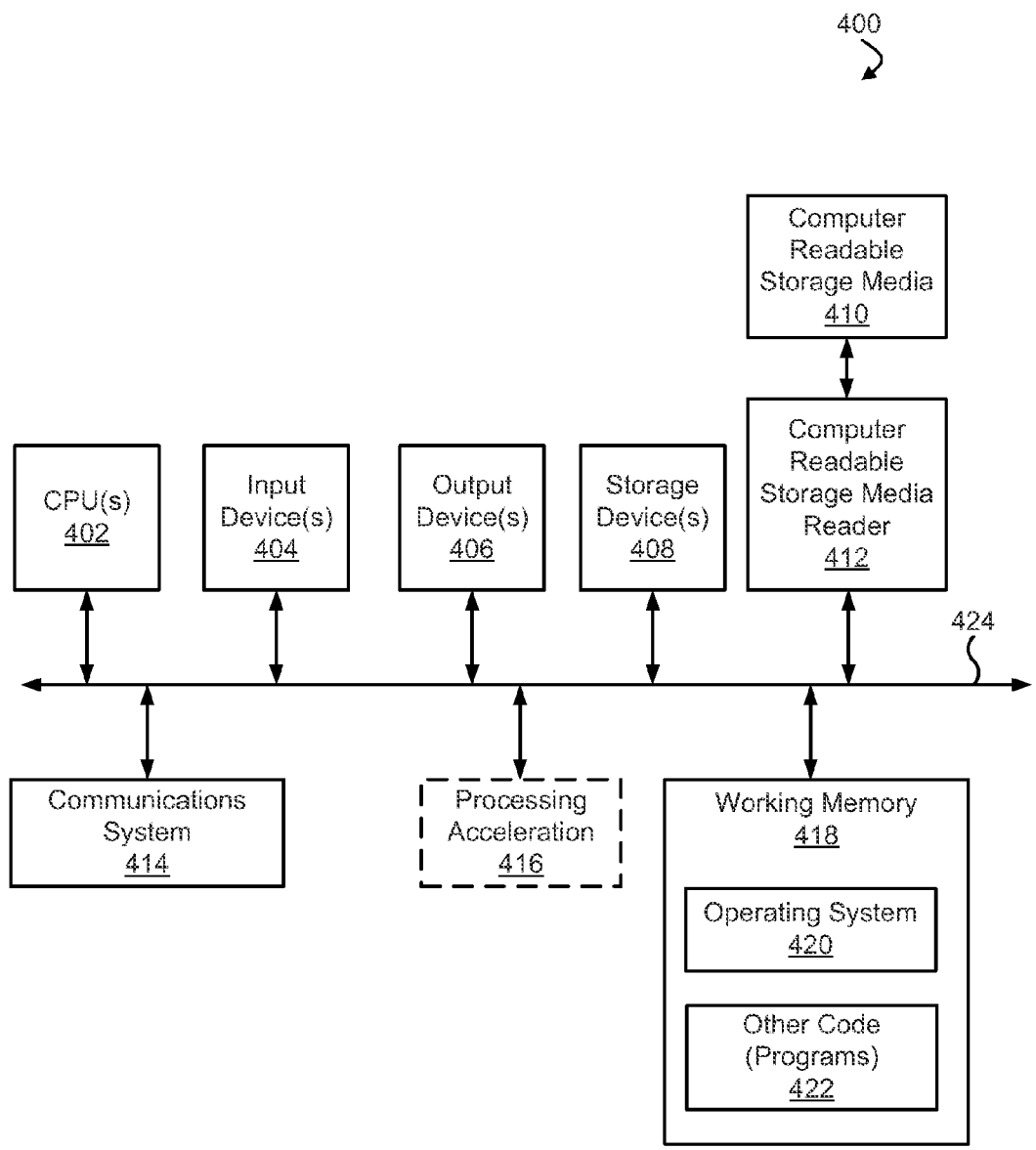
FIG. 4 illustrates an exemplary computer system in which various embodiments of the present invention may be implemented.

FIG. 4 illustrates an exemplary computer system 400 in which various embodiments of the present invention may be implemented. The system 400 may be used to implement any of the computer systems described above, such as the network management system. The computer system 400 is shown comprising hardware elements that may be electrically coupled via a bus 424. The hardware elements may include one or more central processing units (CPUs) 402, one or more input devices 404 (e.g., a mouse, a keyboard, etc.), and one or more output devices 406 (e.g., a display device, a printer, etc.). The computer system 400 may also include one or more storage devices 408. By way of example, the storage device(s) 408 can include devices such as disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 412, a communications system 414 (e.g., a modem, a network card (wireless or wired), an infra-red communication device, etc.), and working memory 418, which may include RAM and ROM devices as described above. In some embodiments, the computer system 400 may also include a processing acceleration unit 416, which can include a digital signal processor DSP, a special-purpose processor, and/or the like.

The computer-readable storage media reader 412 can further be connected to a computer-readable storage medium 410, together (and in combination with storage device(s) 408 in one embodiment) comprehensively representing remote, local, fixed, and/or removable storage devices plus storage media for temporarily and/or more permanently containing, storing, transmitting, and retrieving computer-readable information. The communications system 414 may permit data to be exchanged with the network and/or any other computer described above with respect to the system 400.

The computer system 400 may also comprise software elements, shown as being currently located within a working memory 418, including an operating system 420 and/or other code 422, such as an application program (which may be a client application, Web browser, mid-tier application, RDBMS, etc.). It should be appreciated that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for storing a plurality of instructions, or portions of instructions, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claim.

What is claimed is:

1. A method for detection of network address spoofing and false positive avoidance in a network, the network including one or more hosts and a network management system, the method comprising:

identifying a suspicious host in the network by the network management system, wherein the suspicious host comprises a host having a source MAC address that is associated with multiple varying source IP addresses, wherein each of the source IP addresses is associated with a time to live (TTL) value;

detecting that the TTL value of a data packet received from the suspicious host has been varied;

determining whether the TTL value of the data packet is expected to vary;

determining the suspicious host generated normal traffic in response to determining that the TTL value of the data packet is expected to vary; and determining the suspicious host generated spoofed traffic in response to determining that the TTL value of the data packet is not expected to vary, wherein determining whether the TTL value of the data packet is expected to vary further comprises determining whether the suspicious host is a router, and determining that the TTL value of the data packet is expected to vary in response to the suspicious host being a router.

2. The method of claim 1, wherein identifying the suspicious host comprises:
   inspecting a plurality of traffic summaries, each traffic summary associated with one or more data packets traversing the network, wherein each traffic summary includes a source MAC address, a source IP address; and a time to live (TTL) value;
   tracking the source MAC address, the source IP address; and the TTL value of each traffic summary in a hash map;
   detecting a source MAC address in the hash map that is associated with multiple varying source IP addresses; and
   identifying the source MAC address that is associated with multiple varying source IP addresses as the suspicious host.

3. The method of claim 2, wherein the initial TTL value for the data packet is correlated with a computer operating system of a host of the one or more hosts in the network which generated the data packet.

4. The method of claim 1, wherein determining whether the TTL value of the data packet is expected to vary comprises:
   comparing the plurality of TTL values associated with the suspicious host to a list of TTL values correlated with computer operating systems; and
   determining that the TTL value is not expected to vary where the TTL value appears on the list of TTL values correlated with computer operating systems.

5. The method of claim 1, wherein determining whether the TTL value of the data packet is expected to vary comprises:
   comparing the source MAC address of the suspicious host to a list of MAC addresses of known routers in the network; and
   determining that the TTL value of the data packet is expected to vary where the source MAC address of the suspicious host appears on the list.

6. The method of claim 1, further comprising:
   disabling access to the network by the suspicious host in response to a determination that the suspicious host generated spoofed traffic.

7. A system for detection of network address spoofing in a network, the network including one or more hosts and a plurality of network devices, the system comprising:
   a processor; and
   a memory coupled to the processor, the memory storing machine readable instructions to be implemented by the processor to:
      identify a suspicious host in the network by the network management system wherein the suspicious host comprises a host having a source MAC address that is associated with multiple varying source IP addresses, wherein each of the source IP addresses is associated with a time to live (TTL) value;
      detect that the TTL value of a data packet received from the suspicious host has been varied;
      determine whether the TTL value of the data packet is expected to vary based on determining whether the suspicious host is a router, and determining that the TTL value of the data packet is expected to vary in response to the suspicious host being a router;
      determine the suspicious host generated normal traffic in response to determining that the TTL value of the data packet is expected to vary; and
      determine the suspicious host generated spoofed traffic in response to determining that the TTL value of the data packet is not expected to vary.

8. A non-transitory computer-readable medium storing a plurality of instructions for detection of network address spoofing and false positive avoidance in a network, the network including one or more hosts and a network management system, the plurality of instructions comprising:
   instructions that cause a data processor to identify a suspicious host in the network by the network management system, wherein the suspicious host comprises a host having a source MAC address that is associated with multiple varying source IP addresses, wherein each of the source IP addresses is associated with a time to live (TTL) value;
   instructions that cause the data processor to detect that the TTL value of a data packet received from the suspicious host has been varied;
   instructions that cause the data processor to determine whether the TTL value of the data packet is expected to vary based on determining
   whether the suspicious host is a router, and determining that the TTL value of the data packet is expected to vary in response to the suspicious host being a router; and
   instructions that cause the data processor to determine the suspicious host generated normal traffic in response to determining that the TTL value of the data packet is expected to vary.

9. The non-transitory computer-readable medium of claim 8, wherein the instructions that cause the data processor to determine whether the TTL value of the data packet is expected to vary comprises:
   instructions that cause the data processor to compare the plurality of TTL values associated with the suspicious host to a list of TTL values correlated with computer operating systems; and
   instructions that cause the data processor to determine that the condition TTL value is not expected to vary where the TTL value appears on the list of TTL values correlated with computer operating systems.

* * * * *